Jan. 9, 1968    A. BÄHR    3,362,039
SLUDGE REMOVAL MEANS FOR DRYING BEDS OF SEWAGE PLANTS
Filed July 14, 1965    6 Sheets-Sheet 1

INVENTOR:
ALBERT BÄHR
BY Robert H Jacob
AGT.

Jan. 9, 1968 A. BÄHR 3,362,039
SLUDGE REMOVAL MEANS FOR DRYING BEDS OF SEWAGE PLANTS
Filed July 14, 1965 6 Sheets-Sheet 3

INVENTOR:
ALBERT BÄHR
BY Robert H Jacob
AGT.

United States Patent Office 3,362,039
Patented Jan. 9, 1968

3,362,039
SLUDGE REMOVAL MEANS FOR DRYING
BEDS OF SEWAGE PLANTS
Albert Bähr, Parallelstr. 2a, Elversburg,
Saar, Germany
Filed July 14, 1965, Ser. No. 471,899
Claims priority, application Germany, July 15, 1964,
M 61,742
12 Claims. (Cl. 15—246.5)

ABSTRACT OF THE DISCLOSURE

Sludge removal apparatus for sewage clearing plant utilizing a cell wheel on which a scraper is supported which is carried by a transverse hollow beam on which a conveyor is mounted which receives the sludge picked up by the scraper from the bottom and carried up by the cell wheel to the conveyor which discharges the sludge.

---

Figure 1:
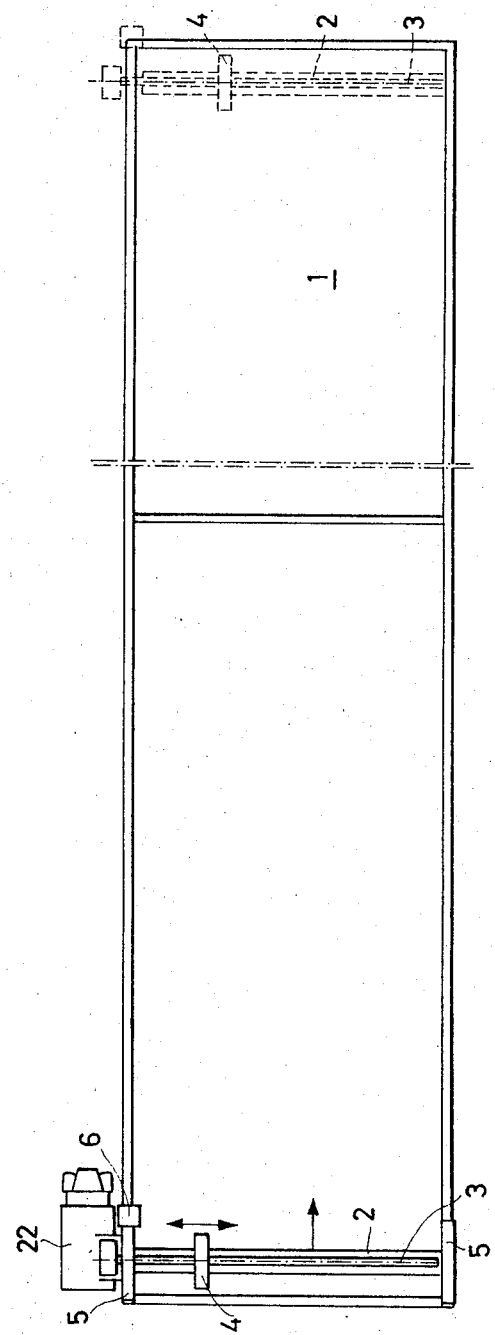

The invention relates to sewage clearing plants. More particularly the invention relates to sludge removal means for the dry beds of clearing plants and deals with the problem of providing an installation of this type which, coupled with relatively simple structural components, provides good clearance or removal efficiency and at the same time small construction costs.

Known arrangements for removing the sludge from the drying beds or tanks in individual scraping layers were provided with a scraping device in the form of a scraping knife which cooperated with an obliquely arranged scraper-conveyor that discharged the scraped off sludge onto a transfer bucket from which it was released from time to time onto a truck to be hauled away. The entire removal installation which comprised a scraping knife and a scraping conveyor was transportable lengthwise of the drying beds or tanks and was also movable obliquely on the traveling platform, but it was constructed in such a manner that it could only operate over a part of the width of the conventional drying tanks, and therefore these drying tanks had to be subdivided by intermediate walls, for example, into three longitudinal sections. Upon emptying of one of these tank sections the entire traveling gear had to be transferred by means of a switching platform to the next longitudinal section of the tank.

This known clearing arrangement required, on the one hand, very high installation costs, owing to the necessary subdividing of the drying tanks longitudinally, and beyond that it was not fully satisfactory in regard to production or output, it was cumbersome for servicing as well as in its manner of operation. The removal of the scraped off sludge by an obliquely disposed scraping conveyor at the front end of which the scraping knife was arranged was also encumbered by the shortcoming that the dead end section which could not be reached mechanically at the end and at the beginning of the drying tank was very large, and the removal mechanism was only able to operate in the direction of travel, so that as a consequence the necessary return movement to the starting position meant an uneconomical idle operation.

The invention concerns a sludge removal installation for the drying tanks of sewage plants having a scraping mechanism cooperating with a transportation means which is movable transversely and longitudinally and resides, besides eliminating the shortcomings described in connection with the known removal installation, in that the scraping means is arranged for travel on a transverse carrier, which preferably spans the entire width of the bed and which cooperates with a transverse conveyor. Furthermore, in the arrangement in accordance with the invention the scraping device proper is devised to be reversible, so that the forward as well as the return travel of the entire installation is exploited for the removal operation.

These fundamental proposals in accordance with the invention are realized in a particularly advantageous manner in that the scraping device comprises a scraping knife and lifting conveyor. This lifting conveyor may be constructed in a particularly advantageous manner in that at the bottom side thereof a scraping knife is provided which is tiltable into two operation positions.

In accordance with a further object of the invention a roughing device can advantageously be provided behind the scraping knife, for example in the form of one or several roughing fingers arranged behind the scraping edge of the scraping knife.

In the removal operation it is then possible to scrape off only the upper dry layer of sludge and to roughen the surface of the sludge remaining in the tanks to thus obtain an evaporation surface that is as large as possible.

In particular, it is possible in accordance with the invention to arrange the transverse beam carrying the scraping means and the transverse conveyor in a manner to be raised and lowered with respect to the driving mechanism and suitably also in the form of a tubular body.

Figure 2:
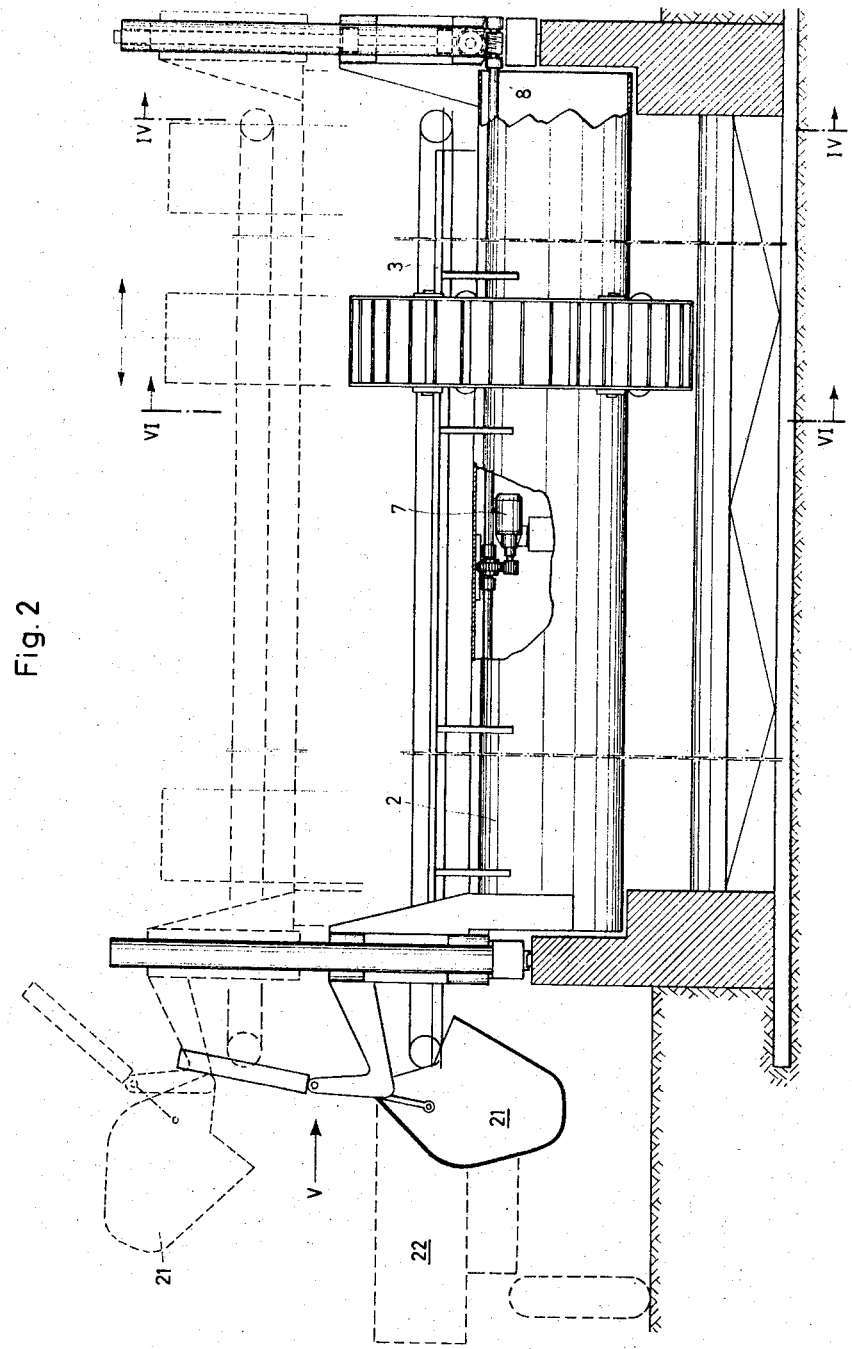
Figure 3:
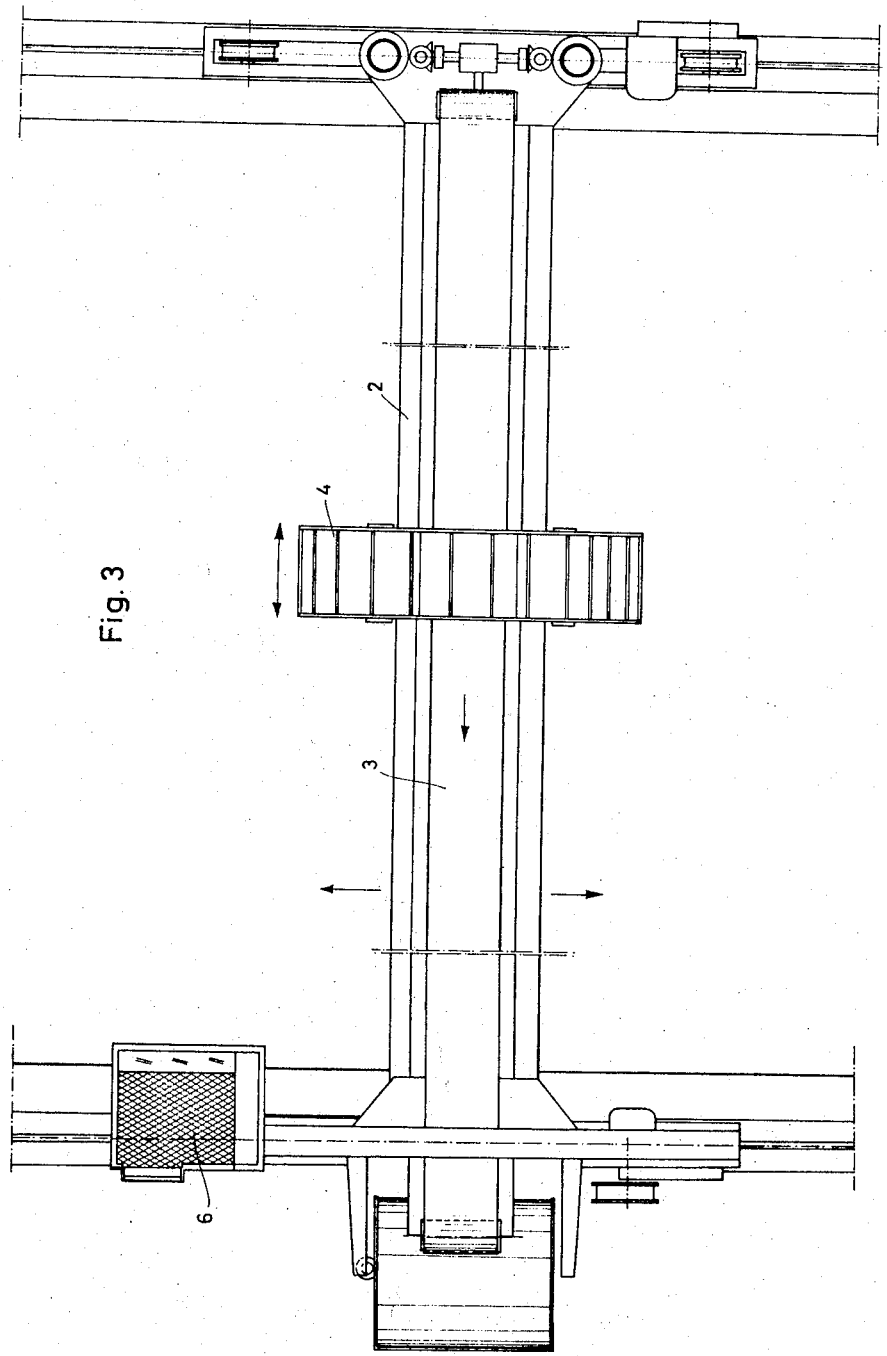
Figure 4:
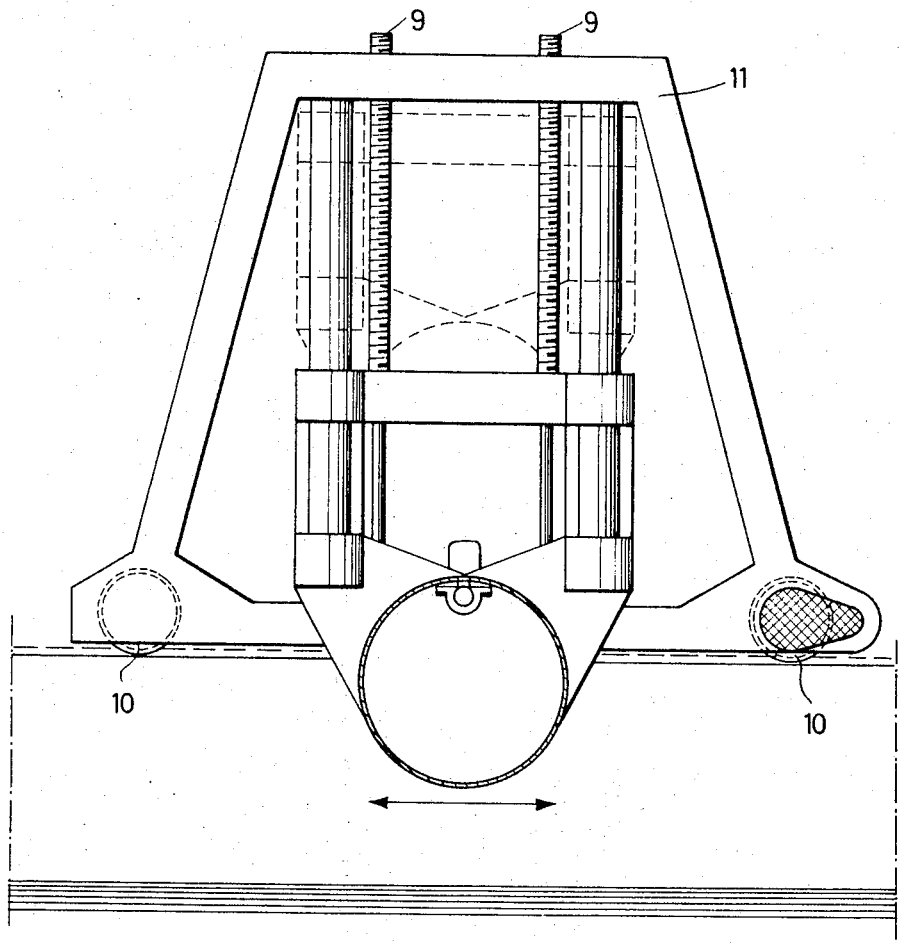
Figure 5:
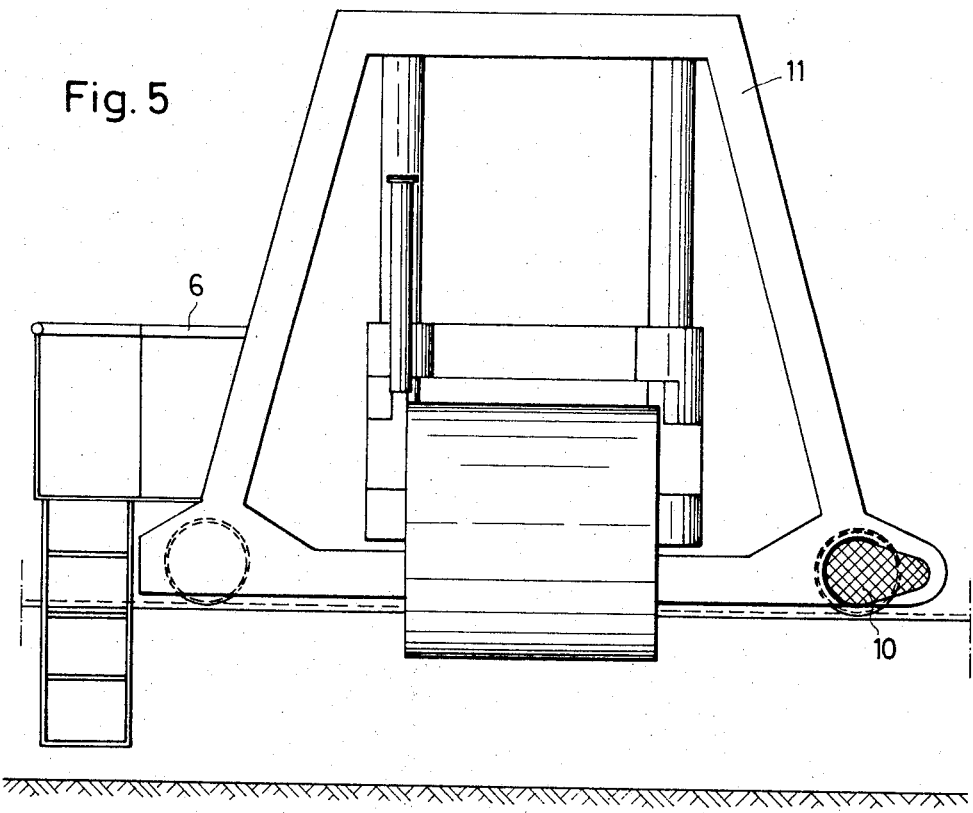
Figure 6:
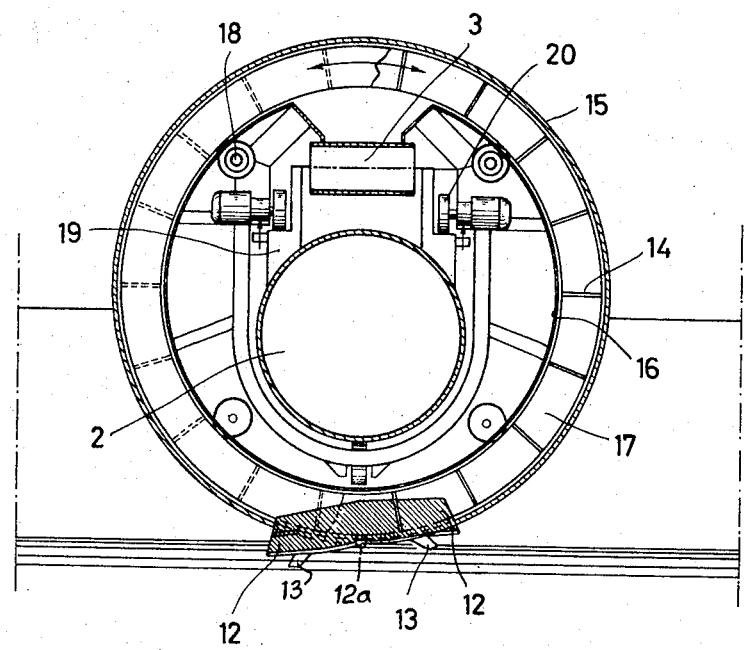

Further details and advantageous features of the invention will become apparent from the following specification with reference to the drawings in which the invention is explained with reference to an embodiment, and in which:

FIG. 1 is a plan view of a schematic illustration of a removal installation in accordance with the invention, FIG. 2 is a side view of a removal installation in accordance with the invention, FIG. 3 is a plan view of the removal installation to an enlarged scale showing details of the transverse beam, FIG. 4 is a section taken along line IV—IV of FIG. 2, FIG. 5 is a side view taken in the direction of the arrow V in FIG. 2, and FIG. 6 is a section taken along the line VI—VI in FIG. 2.

In the overall illustration of the installation FIG. 1 indicates a drying tank or bed 1 of a clearing or removal installation which is spanned over its entire width by a removal apparatus in accordance with the invention and which comprises essentially a transverse beam 2 with transverse conveyor 3 spanning the width of the tank and a scraping arrangement 4 which is movable transversely of the carrier beam 2. The transverse beam 2 is supported at its two ends upon the driving devices 5 which are adapted to transport the entire mechanism along the entire length of the tank 1. A control platform is provided at 6. The scraping arrangement 4 is arranged to be reversible so that each trip along the longitudinal expanse of the tank 1 can be utilized for one scraping operation.

Alone on the basis of this fundamental illustration of the nature of the invention the characteristic advantages of the invention become apparent.

The installation costs of the drying tanks are essentially reduced because the four center walls formerly dividing the tank into longitudinal sections are eliminated. Since the scraping arrangement is made reversible in accordance with the invention the output is essentially increased alone by utilizing the return travel of the machinery.

As shown in FIGS. 2 to 6 the transverse beam is advantageously constructed in the form of a tubular body on the top side of which the transverse conveyor is mounted which is in the form of a belt conveyor. Inside the tubular body 2 the lifting drive means 7 is advantageously arranged which makes it possible by way of the shafts 8 to raise and lower the transverse beam 2 with the material conveyor 3 and the scraping device 4 by, for example 1.2 m., with the aid of the twin lift spindles 9. The drive means 10 preferably includes a portal-shaped guide frame 11 on which the transverse carrier is suspended as particularly illustrated in FIGS. 4 and 5. As shown in FIG. 6, the actual scraping mechanism comprises a tiltable scraping knife 12 movable into two positions of operation about a pivot 12a in the form of a rod, bolt or the like. At the lower side of the scraping knife 12 roughing fingers 13 are arranged behind the scraping edge for roughing the scraped surface. The scraping knife 12 cooperates in accordance with the invention with a lifting conveyor which raises the dried sludge, peeled off by the scraping knife and transfers it to the transverse conveyor. In the embodiment of the invention illustrated, the lifting conveyor preferably comprises a cell wheel 14 which rotates between the outer wall 15 and the inner wall 16 and receives in the individual cells 17 the dried sludge peeled off by the scraping knife and discharges it at the top upon the transverse conveyor which extends through the housing of the cell wheel. The cell wheel is made to rotate by the drive 18 within its housing 15, 16 and is arranged to travel on supports 19 of the supporting structure of the transverse conveyor, upon the transverse carrier beam 2 by means of a driving mechanism 20. The transverse conveyor 3 empties at its left end the sludge that has been scraped off, for example in a transfer bucket 21 which is arranged to be raised and lowered and which discharges its contents, for example to a truck 22.

The scraping knife 12 is pivotally connected with the housing of the cell wheel 14 so that it may be tilted optionally to the left or to the right.

The supporting structure for the conveyor 3 is secured to the transverse beam 2, and this structure is provided with supports or rails 19 upon which the cell wheel 14 with its housing is arranged to ride longitudinally of the transverse beam 2. The movement of the cell wheel with its housing is made possible by carriage means including rollers 20 with the rollers riding on the rails 19 of the transverse beam 2. The carriage means is secured on a U-shaped bail shown in FIG. 6 which is connected to the housing of the cell wheel by means of struts or other supports. Thus the carriage means is a part of the cell wheel and rolls along upon the rails 19 which are secured to the transverse beam 2 and permit the cell wheel to travel over the length of the beam 2.

The installation illustrated in the drawings operates generally in the following manner: When the transverse beam 2 with the scraping device and the transverse conveyor which has a drive means starts at the lower end of the drying basin 1 as seen in FIG. 1, then the dead angle at which the scraping knife 12 begins its work is very small and may still be decreased depending on the construction of the end walls of the drying basin or bed (while adapted to the form of the cell wheel 14, 15, 16). After the setting of the scraping device 4 for the longitudinal strip to be scraped or peeled off the transverse beam 2 with the belt conveyor 3 and the scraping device 4 are lowered to the desired scraping depth, and then driven by the drive means 5 along the longitudinal extent of the drying bed or tank. In this manner the dried sludge is continuously carried off by the scraping knife 12 at the pre-determined thickness of the layer and is conveyed by the rising cell wheel conveyor 4 and the transverse conveyor 3 which transfers the sludge to the transfer bucket 21. The upper surface of the bed in the tank is at the same time roughened by the fingers 13 immediately after the scraping operation. As soon as the removing device has reached the upper end of the drying bed, the scraping device is raised by suitable upward movement of the transverse beam 2, is moved transversely on the beam 2, by an amount corresponding to the desired scraping width, and then the transverse beam 2 is again lowered until it reaches the desired scraping depth for which purpose the scraping knife 12 has been tilted for the new direction of operation. Now the scraping operation is continued in the same manner during the reverse travel. The transfer bucket 21 may be emptied at the end of each trip, depending upon the requirements.

In this, or a similar manner, it is possible by means of the invention to provide a sludge removal arrangement for drying beds, which by virtue of the combination of a scraping knife with a lifting conveyor and a transverse conveyor, together with the movability of the installation upon a transverse beam, obtains a very good output performance with simple structural means and beyond that essentially decreases the installation costs.

All of the technical details illustrated in the drawings and described in the specification are of importance in connection with the invention.

The installation in accordance with the invention may be utilized anywhere where the same, or similar conditions exist for receiving or moving products or materials.

The installation, in accordance with the invention, may also be applied in connection with square or circular beds. In the latter case, the entire removal arrangement may be centrally guided and displaced by means of a central pivot.

Having now described by invention with reference to the embodiment illustrated in the drawings, I do not wish to be limited thereto, but what I desire to protect by Letters Patent of the United States is set forth in the appended claims.

I claim:

1. Sludge removal means for drying beds or tanks of sewage plants, comprising, in combination, a transverse beam extending across the bed or tank from which the sludge is to be removed, a transverse conveyor mounted lengthwise of said beam, a cell wheel supporting a scraping knife mounted on said beam, means operative to move said cell wheel and scraping knife longitudinally of said beam and transversely of said bed, and drive means operative to move said beam with said cell wheel and scraping knife along the length of said bed or tank, the lower end of said cell wheel being in sludge receiving relationship with respect to said scraping knife and the upper end thereof being in discharging relationship relative to said transverse conveyor.

2. Sludge removal means in accordance with claim 1 wherein said scraping knife is provided with roughing means such as roughing fingers arranged rearwardly of the edges of said knife as seen in the direction of travel.

3. Sludge removal means in accordance with claim 1, wherein said transverse beam carrying said cell wheel and said scraping knife is mounted at its ends by means adapted to raise and lower said beam.

4. Sludge removal means in accordance with claim 1, wherein said transverse beam is in the form of a hollow body.

5. Sludge removal means in accordance with claim 4, wherein drive means for raising and lowering said transverse beam are mounted within said hollow body.

6. Sludge removal means in accordance with claim 1, wherein said transverse conveyor is supported with its ends at the end of said beam and extends through said cell wheel.

7. Sludge removal means in accordance with claim 1, wherein a support for said transverse conveyor is mounted on said transverse beam and said cell wheel is mounted upon said support.

8. Sludge removal means in accordance with claim 7 where said cell wheel is adapted to receive the sludge proximate its outer circumference and to discharge the sludge along its inner circumference onto said transverse conveyor.

9. Sludge removal means in accordance with claim 1, where said cell wheel is disposed around said beam and said transverse conveyor.

10. Sludge removal means in accordance with claim 1, where said drive means is reversible to move said beam in two directions.

11. Sludge removal means in accordance with claim 1, where said means for moving said cell wheel and scraping knife is reversible in its direction of rotation.

12. Sludge removal means in accordance with claim 1, where said scraping knife is tiltable about a pivot on said cell wheel.

References Cited

UNITED STATES PATENTS

| 1,986,573 | 1/1935 | Hardinge | 210—525 X |
| 2,453,961 | 11/1948 | Bankauf et al. | 210—524 |
| 3,284,993 | 11/1966 | Sebald et al. | 210—523 X |

CHARLES A. WILLMUTH, *Primary Examiner.*

L. G. MACHLIN, *Assistant Examiner.*